US008333316B2

United States Patent
Heath et al.

(10) Patent No.: US 8,333,316 B2
(45) Date of Patent: Dec. 18, 2012

(54) RECORDING THE POWER DISTRIBUTION HIERARCHY IN DATACENTERS

(75) Inventors: Taliver Brooks Heath, Mountain View, CA (US); Tibor Horvath, Santa Clara, CA (US); Justin Moore, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 73 days.

(21) Appl. No.: 12/827,765

(22) Filed: Jun. 30, 2010

(65) Prior Publication Data
US 2012/0000975 A1 Jan. 5, 2012

(51) Int. Cl.
*G06F 17/00* (2006.01)
(52) U.S. Cl. .......... 235/375; 235/451; 235/462.01; 235/492
(58) Field of Classification Search .......... 235/375, 235/451, 492, 462.01; 340/10.2, 10.5, 572.1
See application file for complete search history.

(56) References Cited

U.S. PATENT DOCUMENTS

| | | | |
|---|---|---|---|
| 6,967,283 B2 | 11/2005 | Rasmussen et al. | |
| 2005/0137813 A1* | 6/2005 | Swarztrauber et al. | 702/62 |
| 2007/0205894 A1* | 9/2007 | Nelson et al. | 340/572.1 |
| 2008/0314979 A1 | 12/2008 | Johnsen et al. | |
| 2010/0241560 A1* | 9/2010 | Landau-Holdsworth et al. | 705/39 |
| 2011/0291813 A1* | 12/2011 | Jansma | 340/10.5 |

FOREIGN PATENT DOCUMENTS

| | | |
|---|---|---|
| KR | 10-0614204 B1 | 8/2006 |
| KR | 10-2009-0125583 A | 12/2009 |

OTHER PUBLICATIONS

International Search Report and Written Opinion for PCT/US2011/041617 mailed Feb. 17, 2012. 10 pages.

* cited by examiner

*Primary Examiner* — Tuyen K Vo
(74) *Attorney, Agent, or Firm* — Fish & Richardson P.C.

(57) ABSTRACT

A power consuming device is configured to be electrically connected to a power connection point of a power distribution system of a datacenter. The power distribution system includes a hierarchy of power supply equipment. A first label is associated with the power connection point and includes power supply information that indicates the power connection point's place in the hierarchy of power supply equipment. A second label is associated with the power consuming device and includes identification information that identifies the power consuming device. A reader is configured to read the first label to obtain the power supply information and to read the second label to obtain the identification information. An electrical connection management system is configured to receive the power supply information and the identification information obtained by the reader such that the electrical connection management system records the connection of the power consuming device to the power connection point and the power connection point's place in the hierarchy of power supply equipment.

24 Claims, 7 Drawing Sheets

RECORDING THE POWER DISTRIBUTION HIERARCHY IN DATACENTERS

TECHNICAL FIELD

This document relates to data centers, and the identification and tracking of equipment in data centers.

BACKGROUND

Electrical distribution inside a facility involves getting the electricity from an entry point to one or more electrical loads in the building. When there are multiple loads, the electrical supply needs to be split up. Such is the case with a data center, such as a server farm, that contains hundreds or thousands of computers. Each computer includes electrical loads, and power coming into the data center needs to be distributed properly to each of the computers.

SUMMARY

In a first aspect, a method includes electrically connecting a power consuming device to power connection point of a power distribution system of a datacenter, wherein the power distribution system includes a hierarchy of power supply equipment, reading a first label associated with the power connection point to obtain power supply information that indicates the power connection point's place in the hierarchy of power supply equipment, reading a second label associated with the power consuming device to obtain identification information that identifies the power consuming device, entering the obtained power supply information and the obtained identification information into an electrical connection management system such that the electrical connection management system records the connection of the power consuming device to the power connection point and the power connection point's place in the hierarchy of power supply equipment.

Implementations can include any, all, or none of the following features. The first label may be placed in proximity to the power connection point, and the second label may be placed in proximity to the power consuming device. The first label may include a first machine readable label and the second label may include a second machine readable label. The first machine readable label can be a first barcode and the second machine readable label can be a second bar code. The first machine readable label can be a first RFID tag and the second machine readable label can be a second RFID tag. The hierarchy of power equipment can include one or more UPSes, one or more busbars, one or more PDUs, one or more PDU panels, and one or more PDU panel circuits. The power connection point can include an electrical connection to a PDU panel circuit. The power connection point can include a single electrical connection. The single electrical connection can be a single electrical connection to a PDU panel circuit. The power connection point can include multiple electrical connections. The method can further include reading a third label associated with a manner of connecting the power consuming device to the multiple electrical connections of the power connection point, the third label including connection information that indicates the manner in which the power consuming device is connected multiple electrical connections of the power connection point, and entering the obtained connection information into the electrical connection management system such that the electrical connection management system records the manner in which the power consuming device is connected multiple electrical connections of the power connection point.

In a second aspect, a system includes a power consuming device, a first label, a second label, a reader, and an electrical connection management system. The power consuming device is configured to be electrically connected to a power connection point of a power distribution system of a datacenter. The power distribution system includes a hierarchy of power supply equipment. The first label is associated with the power connection point and includes power supply information that indicates the power connection point's place in the hierarchy of power supply equipment. The second label is associated with the power consuming device and includes identification information that identifies the power consuming device. The reader is configured to read the first label to obtain the power supply information and to read the second label to obtain the identification information. The electrical connection management system is configured to receive the power supply information and the identification information obtained by the reader such that the electrical connection management system records the connection of the power consuming device to the power connection point and the power connection point's place in the hierarchy of power supply equipment.

Implementations can include any, all, or none of the following features. The first label may be placed in proximity to the power connection point, and the second label may be placed in proximity to the power consuming device. The first label may include a first machine readable label and the second label may include a second machine readable label. The first machine readable label can be a first barcode and the second machine readable label can be a second bar code. The first machine readable label can be a first RFID tag and the second machine readable label can be a second RFID tag. The hierarchy of power equipment can include one or more UPSes, one or more busbars, one or more PDUs, one or more PDU panels, and one or more PDU panel circuits. The power connection point can include an electrical connection to a PDU panel circuit. The power connection point can include a single electrical connection. The single electrical connection can be a single electrical connection to a PDU panel circuit. The power connection point can include multiple electrical connections. a third label associated with a manner of connecting the power consuming device to the multiple electrical connections of the power connection point, the third label including connection information that indicates the manner in which the power consuming device is connected multiple electrical connections of the power connection point. The reader may be configured to read the third label to obtain the connection information. The electrical connection management system may be configured to receive the connection information obtained by the reader such that the electrical connection management system records the manner in which the power consuming device is connected multiple electrical connections of the power connection point The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Large-scale Internet services and the massively parallel computing infrastructure that is required to support them can require the design of warehouse-sized computing systems, made up of thousands or tens of thousands of computing nodes along with their associated power hierarchy and interconnection infrastructure.

Power delivery may be a significant constraint in datacenter layouts, and power receiving equipment is frequently moved around in the power infrastructure to meet that constraint. For example, based on load variations, connections may be reorganized and racks of computers may be moved to better balance phases. However, the frequent reconfigurations may make it difficult to maintain current data on what equipment (e.g., what computer) is powered by each circuit.

Knowledge of accurate connection data may be useful, however, for a number of datacenter operation tasks such as those involving capacity planning or dynamic power management. For example, such knowledge may be used to insure the delivery of the power that will be required by the housed computing equipment, to determine how much computing equipment can be safely and efficiently hosted within a given power budget, and/or to help achieve near maximum power utilization for a given power budget. For some of these applications, having changes to the power connections programmatically accessible in near real time may be useful.

The following describes techniques that may be used for the tracking of powered equipment in a data center and where that equipment is located in the power distribution hierarchy. For example, in one implementation, labels are placed near power connection points, and those labels indicate the respective connection point's place in the power distribution hierarchy. In addition, labels are place on or near power consuming equipment, and those labels indicate identifying information that identifies the respective power consuming equipment. When a piece of power consuming equipment is connected to a power connection point, the labels are scanned and the information is entered into an electrical connection management system, which records the connection of the power consuming device to the power connection point and the power connection point's place in the hierarchy of power supply equipment.

An example of a data center facility and an example of a power distribution hierarchy will be described as an introduction with reference to FIGS. 1A, 1B, and 2.

Figure 1A:
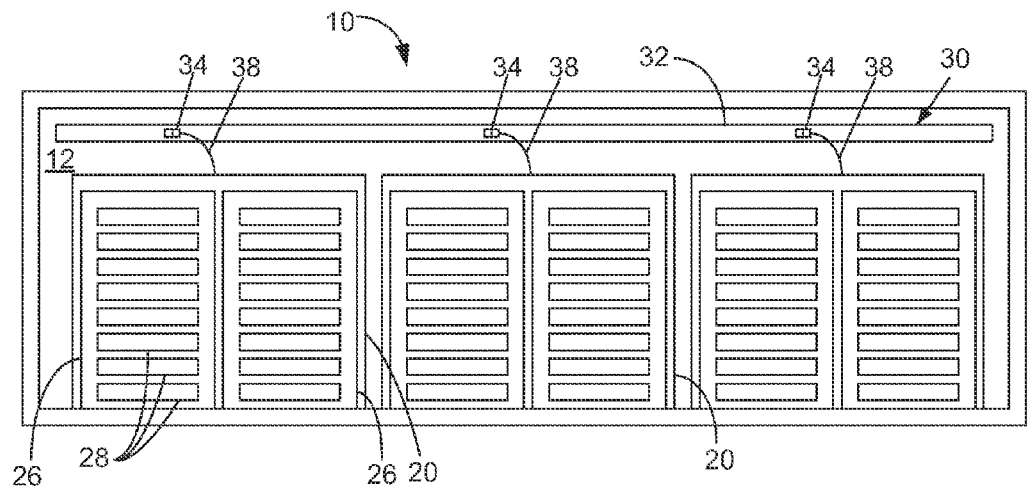
FIGS. 1A and 1B are sectional side and plan views, respectively, of a facility operating as a data center.
Figure 1B:
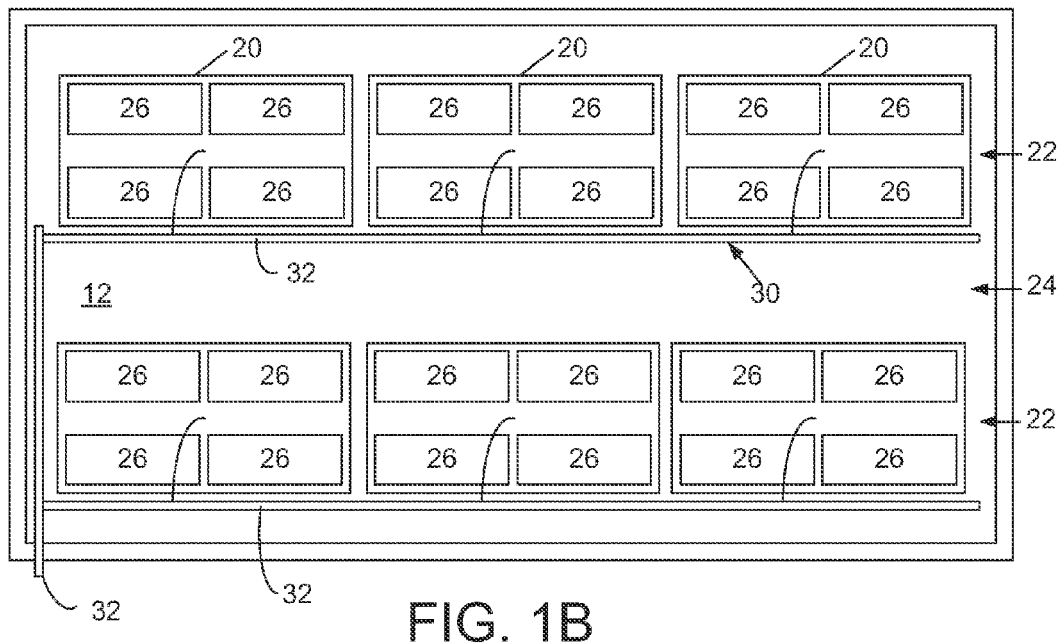

FIGS. 1A and 1B are side and plan views to illustrate an exemplary facility 10 that serves as a data center. The facility 10 includes an enclosed space 12 and can occupy one or more rooms within a building or essentially an entire building. The enclosed space 12 is sufficiently large for installation of numerous (e.g., dozens or hundreds or thousands) racks of computer equipment, and may house hundreds, thousands or tens of thousands of computers.

Modules 20 of rack-mounted computers are arranged in the space in rows 22 separated by access aisles 24. Each module 20 can include multiple racks 26, and each rack includes multiple trays 28. In general, each tray 28 can include a circuit board, such as a motherboard, on which a variety of computer-related components are mounted. A typical rack 26 is a 19" wide and 7' tall enclosure.

The facility also includes a power grid 30 which, in this implementation, includes power distribution "lines" 32 that run parallel to the rows 22. Each power distribution line 32 includes regularly spaced power taps 34 (e.g., outlets or receptacles). The power distribution lines 32 may be busbars suspended on or from a ceiling of the facility. Alternatively, busbars may be replaced by groups of outlets independently wired back to the power supply (e.g., elongated plug strips or receptacles connected to the power supply). As shown, each module 20 can be connected to an adjacent power tap 34 using, for example, power cabling 38. Thus, each circuit board can be connected both to the power grid using, for example, wiring that first runs through the rack itself and the module and which is further connected by the power cabling 38 to a nearby power tap 34.

In operation, the power grid 30 is connected to a power supply, such as a generator or an electric utility, and supplies conventional commercial AC electrical power, such as 120 or 208 Volt at 60 Hz (for the United States). The power distribution lines 32 can be connected to a common electrical supply line 36, which in turn can be connected to the power supply. Optionally, some groups of power distribution lines 32 can be connected through separate electrical supply lines to the power supply.

Many other configurations are possible for the power grid. For example, the power distribution lines can have a different spacing than the rows of rack-mounted computers, the power distribution lines can be positioned over the rows of modules, or the power supply lines can run perpendicular to the rows rather than parallel.

The facility 10 also includes a cooling system to remove heat from the data center. Examples of cooling systems include an air conditioning system to blow cold air through the room, or cooling coils that carry a liquid coolant past the racks. In addition, the facility 10 includes a data grid for connection to the rack-mounted computers to carry data between the computers and an external network, such as the Internet.

The power grid 30 typically is installed during construction of the facility 10 and before installation of the rack-mounted computers (because later installation is both disruptive to the facility and because piece-meal installation may be less cost-efficient). Thus, the size of the facility 10, the placement of the power distribution lines 32, including their spacing and length, and the physical components used for the power supply lines, need to be determined before installation of the rack-mounted computers. Similarly, capacity and configuration of the cooling system needs to be determined before installation of the rack-mounted computers. To determine these factors, the amount and density of the computing equipment to be placed in the facility can be forecast.

Figure 2:
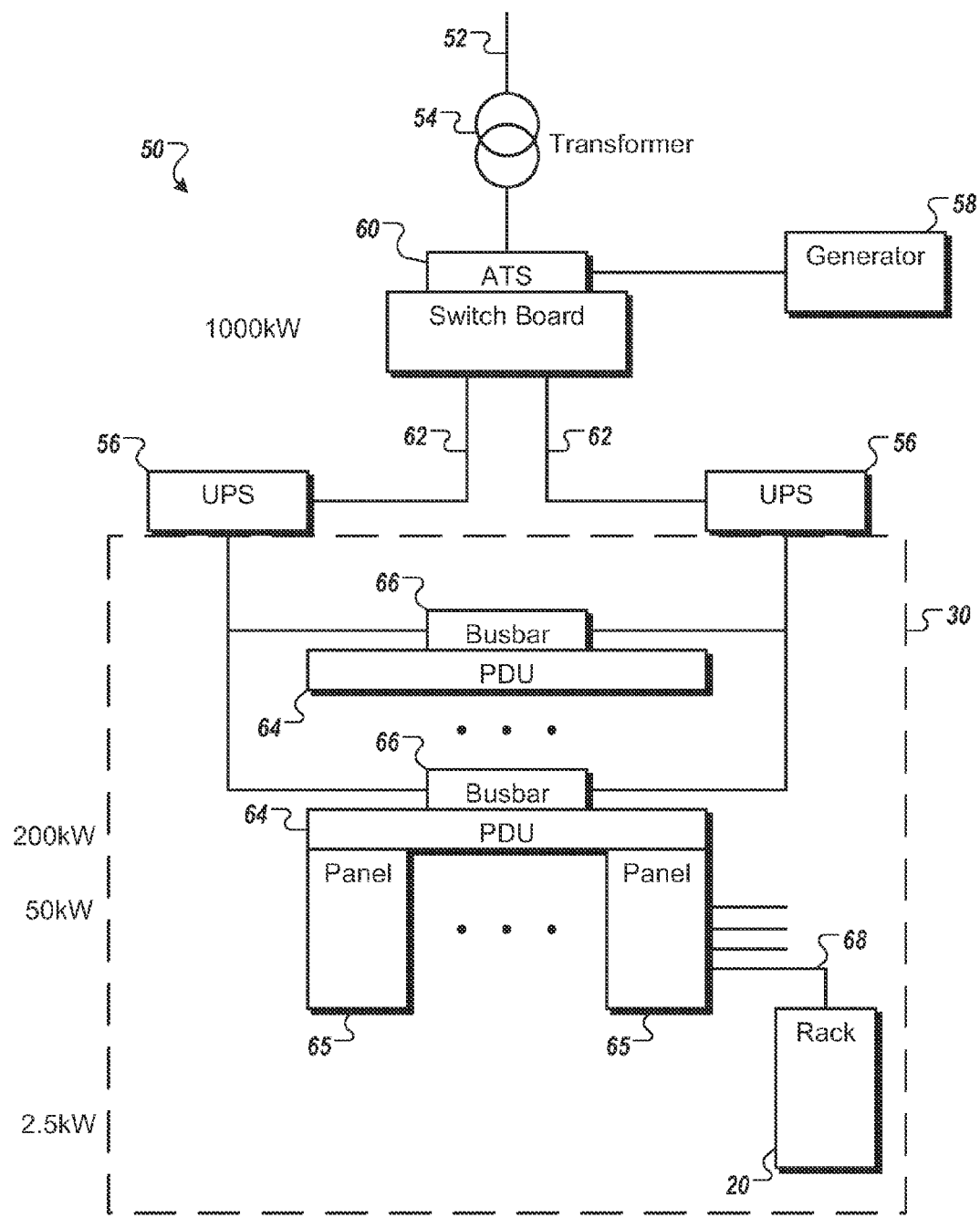
FIG. 2 is a schematic of an example of a datacenter power distribution hierarchy.

FIG. 2 is a schematic of an example of a datacenter power distribution hierarchy 50. The power distribution hierarchy 50 may be used, for example, in a Tier-2 datacenter facility with a total capacity of 100 KW. The rough capacity of the different components is shown on the left side. A medium voltage feed 52 from a substation is first transformed by a transformer 54 down to 480 V. It is common to have an uninterruptible power supply (UPS) 56 and a generator 58 combination to provide back-up power should the main power fail. The UPS 56 is responsible for conditioning power and providing short-term backup, while the generator 58 provides longer-term backup.

An automatic transfer switch (ATS) 60 switches between the generator and the mains, and supplies the rest of the hierarchy. From here, power is supplied via two independent routes 62 in order to assure a degree of fault tolerance. Each side has its own UPS that supplies a series of busbars 66, to which power distribution units (PDUs) 64 are connected.

The PDUs 64 are rated on the order of 75-200 kW each. They further transform the voltage (to 110 or 208 V in the United States) and provide additional conditioning and monitoring, and include distribution panels 65 from which individual circuits 68 emerge. Each panel may provide three phases of AC power, with circuits alternating phases. Circuits 68, which can include the power cabling, power a rack or fraction of a rack worth of computing equipment. The group of circuits provides the power grid 30.

Power deployment restrictions generally occur at three levels: rack, PDU, and facility; however, as shown in FIG. 2, other levels may be employed, such as four levels (for example, 2.5 KW at the rack, 50 KW at the panel, 200 KW at the PDU, and 1000 KW at the switchboard). Enforcement of power limits can be physical or contractual in nature. Physical enforcement means that overloading of electrical circuits will cause circuit breakers to trip, and result in outages. Contractual enforcement is in the form of economic penalties for exceeding the negotiated load (power and/or energy).

Physical limits are generally used at the lower levels of the power distribution system, while contractual limits may show up at the higher levels. At the rack level, breakers or fuses protect individual power supply circuits 68, and this limits the power that can be drawn out of that circuit (in fact, the National Electrical Code Article 645.5(A) limits design load to 80% of the maximum ampacity of the branch circuit). Similarly, each PDU panel 65 may have an associated breaker that limits the power that can be drawn from that panel. Enforcement at the circuit or panel level may be straightforward, because circuits are typically not shared between users.

At higher levels of the power distribution system, larger power units are more likely to be shared between multiple different users. The data center operator is obligated to provide the maximum rated load for each branch circuit up to the contractual limits and assure that the higher levels of the power distribution system can sustain that load. Violating one of these contracts can have steep penalties because the user may be liable for the outage of another user sharing the power distribution infrastructure.

Figure 3:
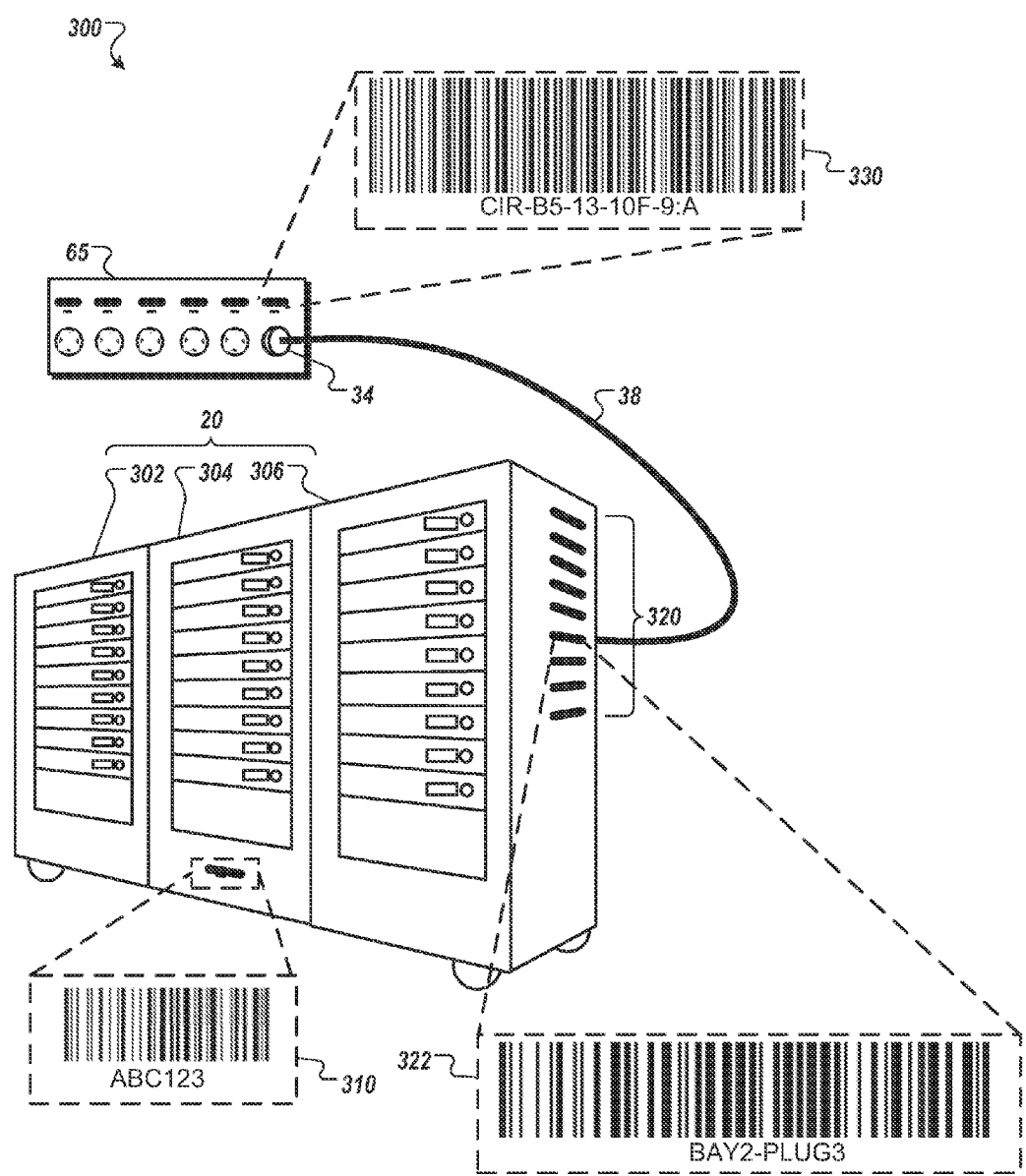
FIG. 3 is an illustration showing an example of a labeling system for use in tracking equipment in datacenter power distribution hierarchy.

FIG. 3 is an illustration showing an example of a labeling system 300 for use in tracking equipment in a power distribution hierarchy of a data center, such as the power distribution hierarchy 50. In the present example, the module 20 includes a bay 302, a bay 304, and a bay 306, and each of the bays 302-306 includes multiple trays on which are mounted a variety of computer-related components (e.g., circuit boards, motherboards). The module 20 is electrically connected to the power tap 34 of the distribution panel 65 by the power cabling 38.

In general, a set of labels are used to track the module 20 and the circuit or circuits to which the module 20 is connected, as well as the details of the power distribution hierarchy above the point at which the module is connected. In general, the labeling system 300 employs three types of labels: a module label, a power connection label, and a power tap label.

A module label 310 is affixed to the module 20 and provides identification information that identifies the module 20 (e.g., the serial number "ABC123"). Also affixed to the module 20 is a collection of power connection labels 320. The power connection labels indicate the manner in which the module 20 is connected to a given power connection point or points. For instance, each of the power connection labels 320 may be associated with a power input point of the module 20, and provides connection information that identifies the associated input point. For example, the module 20 may include nine input points, wherein each of the bays 302-306 may receive power from three of the input points. Each input point may be connected to a different phase, and may supply power to a subset of the trays in one of the bays 302-306. A particular power connection label 322 of the collection of power connection labels 320 identifies the input point that connects to the third power input of the second bay (e.g., the bay 304) using the example identification code "BAY2-PLUG3". The other labels 320 likewise identify an associated input point. These labels can therefore designate the power input point to which a given power connection point is connected.

Each of the power taps 34 is provided with a proximally-located power tap label, such as the power tap label 330. The power tap label 330 identifies the elements of the power distribution hierarchy that supply power to the power tap 34. In some implementations, the power tap label 330 can include information that identifies PDUs, circuits, power phases, bus bars, UPSes, and/or other elements of a power distribution hierarchy. For example, the label 330 includes the identifier "CIR-B5-13-10E-9:A" which may identify that the power distribution hierarchy that supplies power to the power tap 34 includes PDU circuit "9", which delivers power from phase "A" (e.g., of the 3-phase system) and is fed from PDU "10F", fed from bus bar "13", fed from UPS "B5".

In some implementations, the multiple power tap labels and the multiple power connection labels 320 may be replaced with a single power tap label and a single power connection label. For instance, in one implementation, all of the power taps for a given PDU panel 65 are used to power a module 20, and the power taps are connected to the power inputs of the module 20 in a certain pattern. As an example, the PDU panel 65 may have 9 power taps and the module 20 may have 9 power inputs, and a particular pattern may be used to connect the 9 power taps to the 9 power inputs (for example, the connection pattern may be used to balance the power phases across the equipment). In this case, a single power tap label may designate the power distribution hierarchy down to the PDU panel level, and the power connection label may designate the particular pattern used to connect the power taps and power inputs.

The information on the labels is sufficient to designate which power taps are connected to which power inputs (and the associated power equipment at higher levels of the power distribution hierarchy). Furthermore, when the trays in the module 20 are powered by a particular power connection input, the information provided by the labels is sufficient to designate which trays are powered by which circuit (and higher level equipment) in the power distribution hierarchy.

In use, when a module is connected to a power tap, a datacenter technician scans or otherwise records the information provided by the labels 310, 320, and 330. This recorded information can be used to identify the equipment that is powered by a given element of the power grid 30, and/or to determine the equipment and circuits that are used to supply power to a given device. For example, by reading and storing the data provided by the label 310, the particular label 322 of the labels 320, and the label 330, a datacenter technician can later determine that UPS "B5" supplies power to the bay #2 (e.g., bay 304) of the module "ABC123" (e.g., the module 20).

In some implementations, the data provided by the labels 310, 320, and 330 may be associated with power information to provide power management information. For example, a substantially real time measurement of the power consumed by the trays connected to the power connection identified by the power connection label 322 may be associated with the identified power connection. By querying a database of power hierarchy information and substantially real time measurements of tray power consumption, a substantially real time measurement of the power flowing through a selected point in the power distribution hierarchy may be obtained. Examples of systems and processes that employ labels for recording and tracking power distribution hierarchies will be discussed in the descriptions of FIGS. 4-6.

Although the labels 310, 322, and 330 are shown as machine-readable barcodes, other types of labels may be used in other implementations. For example, linear barcode symbologies such as U.P.C., Codabar, code 25, code 39, code 93, code 128, code 128A, CPC binary, DUN 14, EAN 2, EAN 5, EAN 8, EAN 13, GS1-128, GS1 DataBar, ITF-14, Plessey, MSI, JAN, Telepen, or other forms of linear bar codes can be used. Also, matrix (e.g., two-dimensional) bar codes such as 3-DI, ArrayTag, Aztec, chromatic alphabet, chromacode, codablock, code 1, code 16 k, code 49, ColorCode, Compact Matrix Code, DataGlyphs, Datastrip codes, dot code A, EZcode, grid matrix code, high capacity color barcode, Hue-Code, INTACTA.CODE, PDF417, MaxiCode, mCode, PaperDisk, SemaCode, SmartCode, Snowflake, ShotCode, SuperCode, Trillcode, UltraCode, WaterCode, or other forms of 2-D barcodes can be used.

In some implementations, the labels 310, 322, and 330 may be RFID tags. For example, a datacenter technician can bring an RFID reader in to close proximity to each of the labels 310, 322, 330 to use an exchange of radio frequency transmissions to obtain identifying information stored in the labels 310, 322, and 330.

In some implementations, the labels 310, 322, and 330 may be humanly readable or a combination of humanly-readable codes and machine-readable codes. For example, a datacenter technician may read humanly-readable codes (e.g., alphanumeric codes) and input the codes to a computer, or write down the codes for later entry.

Figure 4:
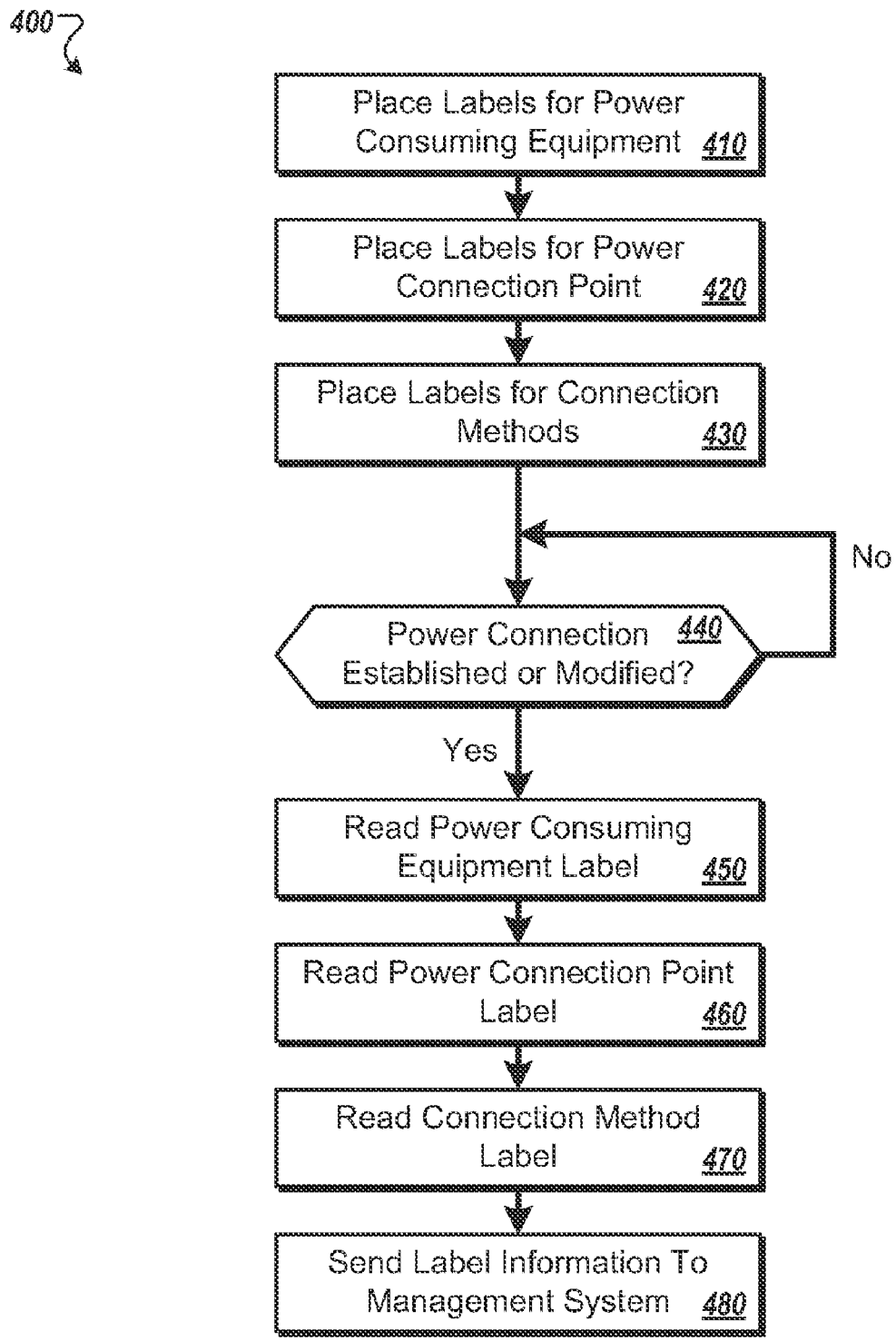
FIG. 4 shows a flow diagram of an example of a process for using labels to track equipment in a power distribution hierarchy of a data center.

FIG. 4 shows the flow diagram of an example process 400 for using labels to track equipment in a power distribution hierarchy of a data center. In general, the process 400 is performed by a person, such as a datacenter technician, using a data entry device such as a bar code reader, a laptop computer, a personal digital assistant, a smartphone, or other device that can communicate information obtained from a label to a database.

The process 400 begins when labels are placed (410) on or near power consuming equipment, and labels are placed (420) on or near power connection points. For example, the datacenter technician can use a computer and printer to print the module label 310 of FIG. 3 and apply or otherwise affix it to the module 20. Likewise, the datacenter technician can print and apply the power tap label 330 near the power tap 34.

The datacenter technician also places (430) labels for power connection methods. For example, the datacenter technician can print and affix the power connection label 322 near the power connection input identified by the power connection label 322.

A datacenter technician may then establish or modify a power connection (440). For example, a new power connection may be established when a new module (e.g., the module 20) is added to the power grid 30 by electrically connecting a power input on the module to one of the power taps 30. In another example, a power connection may be modified when a module is disconnected from one of the power taps 34 and plugged into a different one of the power taps 34.

When a power connection is established or modified (440), the label of the power consuming equipment involved in the new or modified connection is read (450). For example, the datacenter technician may use a bar code reader or RFID reader to obtain information from the label that identifies the power consuming equipment to which it is affixed. In another example, the datacenter technician may read the label and enter the label's information into a computing device, or write the information down for later entry into a computing device. Similarly, the label associated with the power connection point is read (460) and the label associated with the connection method is read (470).

The information obtained from the labels is then sent (480) to a management system. For example, a handheld bar code scanner, a PDA, or other device may be used to read the labels and then electronically transmit the information obtained from the labels to power connection management system that stores and manages the label information to track the power distribution hierarchy. In some implementations, the management system may use the label information to associate one or more power-consuming devices with a power connection method and a power connection point to describe an electrical connection path within a power grid. Examples of the equipment used to obtain and manage label information are discussed in the description of FIG. 5.

Figure 5:
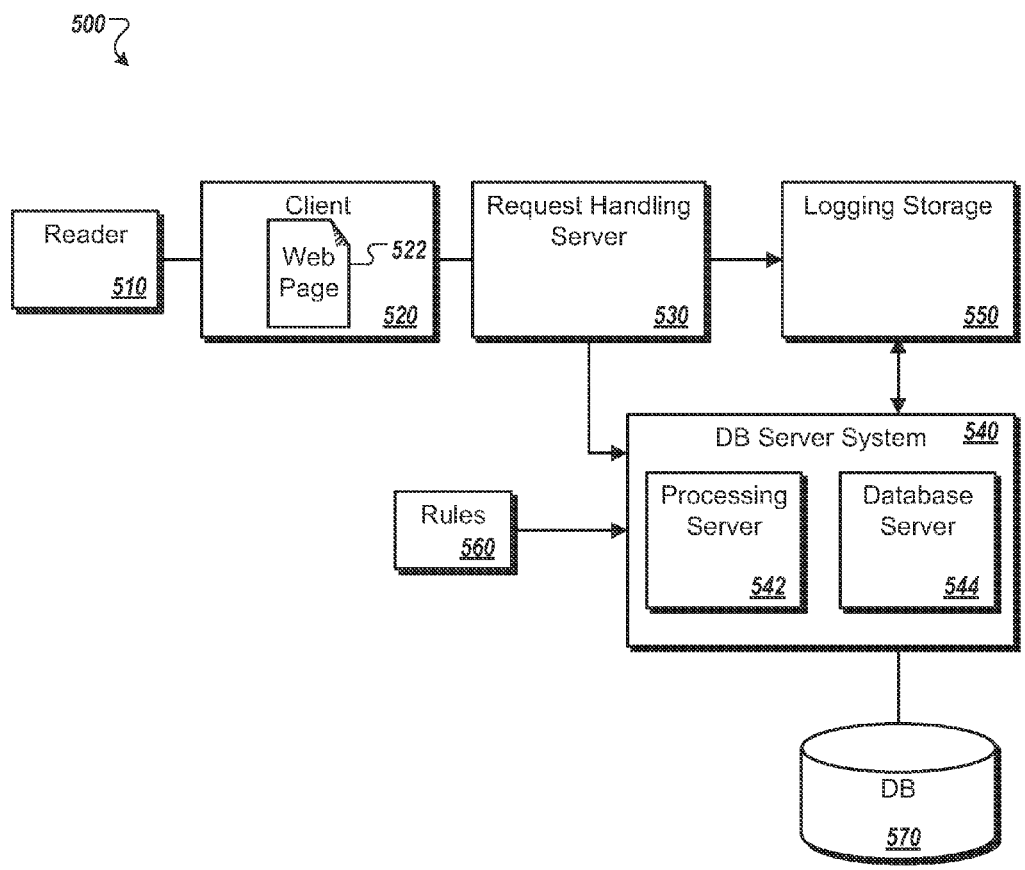
FIG. 5 is a block diagram of an example of a tracking system for processing and storing information that describes a power distribution hierarchy in a data center.

FIG. 5 is a block diagram of an example of a tracking system 500 for processing and storing information that describes a power distribution hierarchy in a data center. For example, the system 500 may be used to read and manage the labels 310, 320, and 330 of FIG. 3 to track the power connections within the power grid 30.

The system 500 includes a label reader 510. In some implementations, the label reader 510 may be a bar code scanner or RFID reader. In other implementations, the reader may be replaced by a person who reads the labels manually.

The reader 510 is used, for instance, to read the module label 310 to obtain identification information that identifies the power consuming device. The reader 510 is also used to read the power tap label 330 to obtain power supply information that indicates the power connection point's place in the hierarchy of power supply equipment. In addition, the reader 510 is used to read the power connection label to obtain connection information that indicates the manner in which the power consuming device is connected multiple electrical connections of the power connection point.

The obtained information is transmitted to a client device 520 that provides a web page 522 for entry of the label information. For example, a bar code or RFID scanner may use a software module known as a "keyboard wedge" to enter the bar code information into the web page 522 by emulating input from a keyboard or other input device. In an example of manual entry, the person reading the labels may enter the label information into the web page 522 through a combination of keyboard, pointer, and/or other input methods. In some implementations, the client device 520 may perform client-side processing of the input information. For example, the client device 520 may validate the input information to determine if the input information matches a character pattern that is associated with the labels 310, 320, or 330 before allowing any further processing of the input information.

The client device 520 communicates the input information to a request handling server 530. In some implementations, the request handling server 530 accepts the input information, puts the input information in a protocol buffer, and encodes the input information. In some implementations, the protocol buffer may be a language-neutral, platform-neutral, extensible mechanism for serializing structured data. For example, a structure that is similar to XML, but smaller, faster, and simpler wherein users may define how data can be structured once, then special generated source code can be used to write and read the structured data to and from a variety of data streams and using a variety of languages such as Java, C++, or Python. The request handling server 530 provides the input information to a database system 540 and a logging storage system 550.

The logging storage system 550 associates each received item of input information with a time stamp, and stores the time-stamped information to create a history log of information provided by the reader device 510. For example, the logging storage system may store a history file of time-stamped input information, or may access the database server system 540 or another database server system to store the time-stamped information. In some implementations, the history log may be used to recover or replace information that was lost or never received by the database server system 550 (e.g., due to a network malfunction, equipment malfunction, human error).

In some implementations, the label reader 510 and the client device 520 may be integrated as a single device, such as a handheld bar code scanning terminal. In some implementations, the web page 522 may be replaced by a software application running on the client device 520 or a combined reader and client device. For example, a handheld RFID terminal may read RFID label information and pass the information to the request server 530 via a client software application. In another example, the client request server 530 may provide a web service that the client device 520 may access to submit label information without using the web page 522.

The database server system 540 includes a processing server 542 and a database server 544. The processing server 542 receives label information provided by the request handling server 530, and processes the information against a collection of rules 560. In some implementations, the rules 560 may describe or define the proper syntax for the information obtained from the labels. For example, the rules may describe that the information obtained from a label may be formatted as "<specifier><separator><hierarchy>" and a hierarchy may be formatted as "<levelname><separator><hierarchy>|<levelname>", where the specifier and levelname may include alphanumeric characters or underscores, and the separator may be a character such as a colon, pound sign, ampersand, exclamation point, semicolon, dash, minus, plus, equals, or dollar sign. Examples of properly formatted labels may include "B09-A-1-a-1-37", "SDC-A-1", "BDC:1#A-1@CHS", "aa_!a", and "A!B@C#D$E-F-1234567".

In some implementations the rules 560 may define that some characters may or may not be required to appear in certain locations, or at all, within a properly formatted label. For example, the rules 560 may define that spaces are not allowed in label information, or that a separator may not appear at the beginning or end of a label's information. Examples of improperly formatted labels may include "Hello" (reason: no separator), "You! there" (reason: space in the label), and "This#is#a#label#" (reason: cannot end with a separator).

Using the rules, the processing server 542 processes the information input from the read labels, and determines what changes need to be made to the database 570 to reflect the new information about the power consuming device's connection to the power distribution hierarchy. For example, the processing server 542 may determine which nodes in the power distribution hierarchy need to be updated to reflect the newly established or modified connection of the power consuming equipment and, based on this information, which records in the database 570 need to be modified.

The processing server 542 then instructs the database server 544 to modify the database appropriately. The database server 544 is a software process that provides database services to other computer programs or computers and manages access to a database 570. As an example, the processing server 542 may determine and issue a set of SQL commands to the database server 544, which cause the database server 544 to modify the database 570 to reflect the newly established or modified connection of the power consuming equipment and the power consuming device's associated place in the power distribution hierarchy. In some implementations, the database server 544 may access the logging storage system 550 to record a history of processed label information storage operations. In some implementations, the information stored by the logging storage system 550 can be passed (e.g., "played back") to the database server 544 to rebuild the database 570 if needed.

Figure 6:
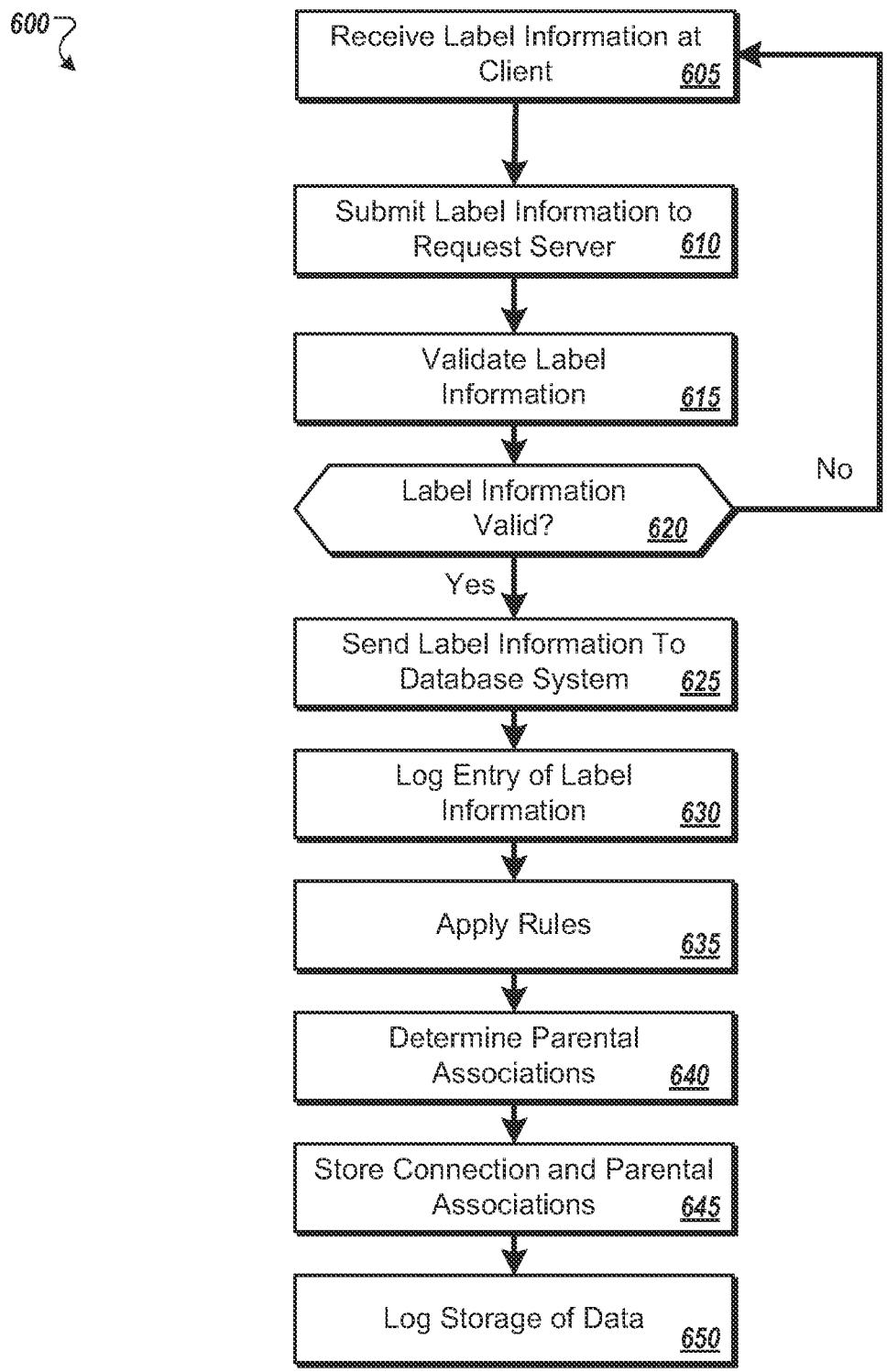
FIG. 6 shows a flow diagram of an example of a process for processing and storing information that describes a power distribution hierarchy in a data center.

FIG. 6 shows a flow diagram of an example process 600 for processing and storing information that describes a power distribution hierarchy in a data center, such as the facility 10 of FIG. 1. In some implementations, the process 600 may be carried out by the system 500 of FIG. 5. The process 600 begins when label information is received (605) at a client device. For example, the process 600 may begin when the client device 520 receives label information from the label reader 510. In other implementations, the process 600 may begin when a human operator manually enters label information into a label data entry application running on the client device.

The label information is then submitted (610) to a request server, such as the request server 530. In some implementations, the label information may be submitted (610) through the web page 522, or through a software application running on the client device 520.

The request server validates (615) the label information to determine if the label information is in an acceptable format, has been properly entered, or is otherwise in condition for processing by a database system. For example, the label information may be validated (615) to screen out misread or incorrectly entered label information, or to screen out barcodes that may be scanned inadvertently (e.g., when an operator accidentally scans the UPC code on a soda can) since those labels may not to conform to a format used for tracking devices in a power hierarchy.

If the label information is determined (620) to be invalid, then the process 600 returns to receive (605) label information at the client. If the label information is determined (620) to be valid, then the label information is sent (625) to a database system. In some implementations, the database system may be the database server system 540 of FIG. 5.

Once the label information is received by the database server, the database server logs (630) the entry of the label information. In some implementations, the label information may be associated with a time stamp to facilitate buffering of label information for later storage in a database of stored label information, or for rebuilding a database of stored label information. In some implementations, the label information may be logged (630) to a logging storage system such as the logging storage system 550.

The database server applies (635) rules to the label information. In some implementations, the rules may define or describe how label information is to be parsed or combined to retrieve power hierarchy information. The label information is parsed to determine (640) parental information. For example, the information from the labels 310, 322, and 330 can be parsed and/or associated to determine the connection of a power-consuming device to a power connection point and the power connection point's place in the hierarchy of power supply equipment.

The connection and parental associations are then stored (645). In some implementations, the associations may be stored as one or more records in one or more databases, such as the database 570, flat files, XML files, or other format that can be used to electronically store the connection and parental associations. The storage of data, such as the connection and parental associations, is also logged (650). In some implementations, the data may be associated with a time stamp and logged (650) to buffer the data prior to storing (645) the data. In some implementations, the data may be logged (650) to facilitate the rebuilding of the database.

Figure 7:
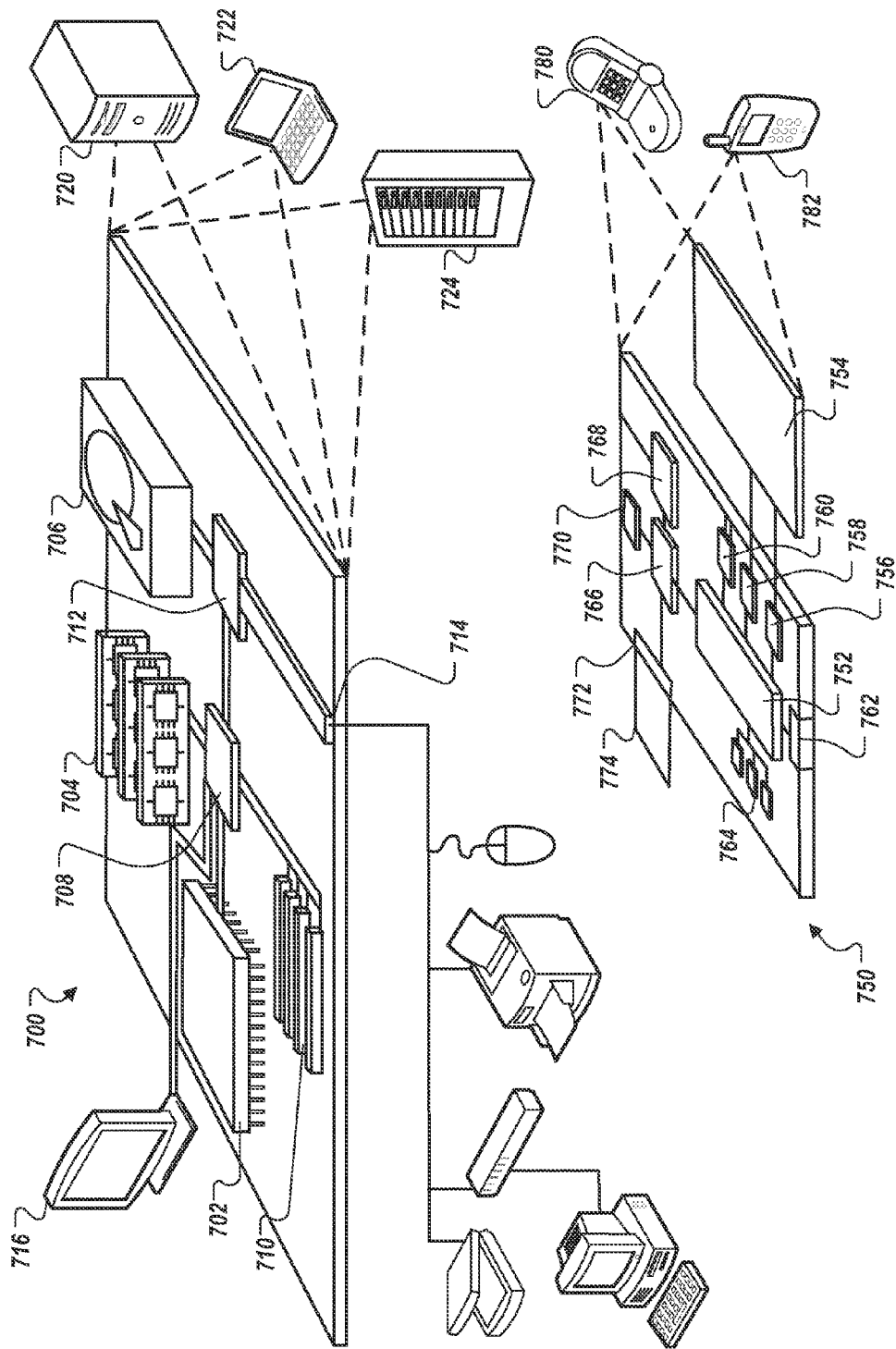
FIG. 7 is a block diagram of computing devices that may be used to implement the systems and methods described in this document.

FIG. 7 is a block diagram of computing devices 700, 750 that may be used to implement the systems and methods described in this document, either as a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, bar code scanning terminals, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method comprising:
electrically connecting a power consuming module to a power connection point of a power distribution system of a datacenter, wherein the power consuming module includes one or more power consuming devices, and the power distribution system includes a hierarchy of power supply equipment, wherein:
the hierarchy includes at least one uninterruptable power supply (UPS), one or more power distribution units (PDUs), and the power connection point,
the UPS is electrically connected to the one or more PDUs,
a first one of the PDUs is electrically connected to the power connection point, and
the UPS supplies power to the first PDU and the first PDU supplies power to the connection point;
reading a first label associated with the power connection point to obtain power supply information that indicates a sequence of a plurality of power distribution elements in the hierarchy of power supply equipment, wherein the sequence includes the UPS, the first PDU, and the power connection point;
reading a second label associated with the power consuming module to obtain identification information that identifies the power consuming module;
entering the obtained power supply information and the obtained identification information into an electrical connection management system such that the electrical connection management system records the connection of the power consuming module to the power connection point and the power connection point's place in the hierarchy of power supply equipment.

2. The method of claim 1 further comprising:
placing the first label in proximity to the power connection point; and
placing the second label in proximity to the power consuming module.

3. The method of claim 1 wherein the first label comprises a first machine readable label and the second label comprises a second machine readable label.

4. The method of claim 3 wherein the first machine readable label includes a first barcode and the second machine readable label includes a second barcode.

5. The method of claim 3 wherein the first machine readable label is a first RFID tag and the second machine readable label is a second RFID tag.

6. The method of claim 1 wherein each of the one or more PDUs includes one or more PDU panels, and one or more PDU panel circuits.

7. The method of claim 1 wherein the power connection point comprises an electrical connection to a PDU panel circuit.

8. The method of claim 1 wherein the power connection point comprises a single electrical connection.

9. The method of claim 8 wherein the single electrical connection is a single electrical connection to a PDU panel circuit.

10. The method of claim 1 wherein the power connection point comprises multiple electrical connections.

11. The method of claim 10 further comprising:
reading a third label associated with a manner of connecting the power consuming module to the multiple electrical connections of the power connection point, the third label including connection information that indicates the manner in which the one or more power consuming devices of the power consuming module are connected to the multiple electrical connections of the power connection point; and
entering the obtained connection information into the electrical connection management system such that the electrical connection management system records the manner in which the power consuming module is connected multiple electrical connections of the power connection point.

12. The method of claim 1 further comprising:
reading a third label associated with a manner of connecting the power consuming module to the power connection point, the third label including connection information that indicates the manner in which the power consuming module is connected to the power connection point; and
entering the obtained connection information into the electrical connection management system such that the electrical connection management system records the manner in which the power consuming module is connected to the power connection point.

13. A system comprising:
a power consuming module configured to be electrically connected to a power connection point of a power distribution system of a datacenter, wherein the power consuming module includes one or more power consuming devices, and the power distribution system includes a hierarchy of power supply equipment, wherein:
the hierarchy includes at least one uninterruptable power supply (UPS), one or more power distribution units (PDUs), and the power connection point,
the UPS is electrically connected to the one or more PDUs,
a first one of the PDUs is electrically connected to the power connection point, and
the UPS supplies power to the first PDU and the first PDU supplies power to the connection point;
a first label associated with the power connection point and including power supply information that indicates a sequence of a plurality of power distribution elements in the hierarchy of power supply equipment, wherein the sequence includes the UPS, the first PDU, and the power connection point;
a second label associated with the power consuming module and including identification information that identifies the power consuming module,
a reader configured to read the first label to obtain the power supply information and to read the second label to obtain the identification information; and
an electrical connection management system configured to receive the power supply information and the identification information obtained by the reader such that the electrical connection management system records the connection of the power consuming module to the power connection point and the power connection point's place in the hierarchy of power supply equipment.

14. The system of claim 13 wherein the first label is placed in proximity to the power connection point and the second label is placed in proximity to the power consuming module.

15. The system of claim 13 wherein the first label comprises a first machine readable label and the second label comprises a second machine readable label.

16. The system of claim 15 wherein the first machine readable label includes a first barcode and the second machine readable label includes a second bar code.

17. The system of claim 15 wherein the first machine readable label is a first RFID tag and the second machine readable label is a second RFID tag.

18. The system of claim 13 wherein each of the one or more PDUs includes one or more PDU panels, and one or more PDU panel circuits.

19. The system of claim 13 wherein the power connection point comprises an electrical connection to a PDU panel circuit.

20. The system of claim 13 wherein the power connection point comprises a single electrical connection.

21. The system of claim 20 wherein the single electrical connection is a single electrical connection to a PDU panel circuit.

22. The system of claim 13 wherein the power connection point comprises multiple electrical connections.

23. The system of claim 22 further comprising:
a third label associated with a manner of connecting the power consuming module to the multiple electrical connections of the power connection point, the third label including connection information that indicates the manner in which the one or more power consuming devices of the power consuming module are connected to the multiple electrical connections of the power connection point;
wherein the reader is configured to read the third label to obtain the connection information; and
wherein the electrical connection management system is configured to receive the connection information obtained by the reader such that the electrical connection management system records the manner in which the power consuming module is connected multiple electrical connections of the power connection point.

24. The system of claim 13 further comprising:
a third label associated with a manner of connecting the power consuming module to the multiple electrical connections of the power connection point, the third label including connection information that indicates the manner in which the power consuming module is connected multiple electrical connections of the power connection point;
wherein the reader is configured to read the third label to obtain the connection information; and
wherein the electrical connection management system is configured to receive the connection information obtained by the reader such that the electrical connection management system records the manner in which the power consuming module is connected multiple electrical connections of the power connection point.

* * * * *

UNITED STATES PATENT AND TRADEMARK OFFICE
CERTIFICATE OF CORRECTION

PATENT NO. : 8,333,316 B2  
APPLICATION NO. : 12/827765  
DATED : December 18, 2012  
INVENTOR(S) : Taliver Heath, Tibor Horvath and Justin Moore Page 1 of 1

It is certified that error appears in the above-identified patent and that said Letters Patent is hereby corrected as shown below:

Column 15, Line 12, Claim 1, delete "uninterruptable" insert --uninterruptible--.

Column 16, Line 9, Claim 11, delete "connected" insert --connected to the--.

Column 16, Line 31, Claim 13, delete "uninterruptable" insert --uninterruptible--.

Column 16, Line 67, Claim 16, delete "bar code" insert --barcode--.

Column 18, Line 7, Claim 23, delete "connected" insert --connected to the--.

Column 18, Line 14-15, Claim 24, delete "connected" insert --connected to the--.

Column 18, Line 23, Claim 24, delete "connected" insert --connected to the--.

Signed and Sealed this  
Twelfth Day of March, 2013

Teresa Stanek Rea  
*Acting Director of the United States Patent and Trademark Office*